United States Patent [19]
Krajewski

[11] Patent Number: 6,045,636
[45] Date of Patent: *Apr. 4, 2000

[54] METHOD FOR SLIVER ELIMINATION IN SHEARING ALUMINUM SHEET

[75] Inventor: Paul Edward Krajewski, Sterling Heights, Mich.

[73] Assignee: General Motors Corporation, Detroit, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/856,784

[22] Filed: May 15, 1997

[51] Int. Cl.$^7$ ........................................................ C22F 1/00
[52] U.S. Cl. ........................... 148/688; 148/698; 148/415; 148/437; 420/528
[58] Field of Search ..................... 148/688, 698, 148/415, 437; 420/528

[56] References Cited

U.S. PATENT DOCUMENTS

| | | | |
|---|---|---|---|
| 3,856,584 | 12/1974 | Cina | 148/159 |
| 4,235,646 | 11/1980 | Neufeld et al. | 148/2 |
| 4,614,552 | 9/1986 | Fortin et al. | 148/417 |
| 4,766,664 | 8/1988 | Benedyk | 29/512 |

FOREIGN PATENT DOCUMENTS

| | | |
|---|---|---|
| 572 029 | 9/1945 | United Kingdom . |
| 2 150 871 | 9/1985 | United Kingdom . |
| WO 85/02141 | 5/1985 | WIPO . |

*Primary Examiner*—Patrick Ryan
*Assistant Examiner*—M. Alexandra Elve
*Attorney, Agent, or Firm*—George A. Grove

[57] ABSTRACT

Age-hardened aluminum alloy sheet can be subjected to a shearing operation, such as trimming or piercing, with reduced sliver formation by first heating the region to be sheared to a temperature above about 250° C., immediately quenching the heated region to soften the region, and then performing the shearing operation in the softened region before age-hardening occurs.

6 Claims, 2 Drawing Sheets

METHOD FOR SLIVER ELIMINATION IN SHEARING ALUMINUM SHEET

TECHNICAL FIELD

This invention pertains to the forming of age-hardened aluminum sheet material, and more specifically it relates to improvements in performing shearing operations on such aluminum sheet materials.

BACKGROUND OF THE INVENTION

The use of aluminum alloys in the manufacture of automobile bodies and components has increased in part due to the need to reduce the weight of the vehicles for improved fuel economy. One application for aluminum alloys in the manufacture of automobiles is in the forming of body panels from aluminum alloy sheet stock. For example, hoods, doors and deck lids are formed by stamping an inner panel and an outer panel from suitable aluminum sheet stock. The outer panel forms the decorative and functional outline of the vehicle panel. The inner panel serves a reinforcing function. In the manufacture, then, of such panels and the like, it is often necessary to trim or pierce a previously stamped aluminum sheet. However, aluminum alloys have different forming characteristics than the long-used low carbon steel sheets. For example, the trimming or piercing of such steel sheets rarely yields metal slivers that mar the part or the trim or piercing dies.

A series of aluminum sheet alloys have been developed which are strong and hard due to the presence of precipitated, finely divided hardening particles. One such series is the AA2XXX series in which small amounts of copper and magnesium, for example, are added to the aluminum alloy to contribute to hardening particle formation. Another series is the AA6XXX series where silicon, magnesium and copper are added for hardening. A third series is the AA7XXX series where zinc, magnesium and copper, for example, are added as hardening constituents. These alloys are well known and commercially available. They are formed into sheet stock from cast billets by a suitable sequence of hot rolling and cold rolling operations. Usually at the finish of the sheet forming/rolling operation, the sheet material is heated to dissolve in solid solution the small amounts of prospective hardening particles or transition phases such as $Mg_2Si$ or GP zones (e.g., in the 6XXX series) and the like. The sheet is then quenched to retain the secondary phases in an unstable solution. The quenched material may be allowed to age at room temperature, whereupon the dissolved hardening constituents slowly reprecipitate in a very finely divided state to strengthen and harden the sheet. Such room temperature-aged alloys are usually identified as having a T4 temper designation. In some cases, the alloy is heated to a temperature of between 150° C. and 200° C. after the quenching operation to induce reprecipitation of the hardening phases. The alloy is then designated as being in a T6 temper condition. The T6 alloys are usually stronger and harder than the T4 alloys. The terms "age hardening" and "precipitation hardening" are used interchangeably herein to include aluminum alloys aged at room temperature and alloys heated above room temperature to accelerate or increase the strengthening and hardening effect.

Thus, when an automobile body panel is formed from an aluminum alloy such as AA6111-T4, it is in an age-hardened condition. The properties of the alloy are a compromise which enable it to undergo suitable stamping, drawing, trimming and piercing operations and the like for shaping into a body panel and yet provide suitable strength and hardness in the finished panel.

A difficulty is that such age-hardened alloys, for example, the AA 2XXX, 6XXX and 7XXX series, are not as ductile as low carbon steels used for automobile body panels, and the aluminum alloys produce slivers when sheared as in a trimming or piercing operation. Sliver formation in trimming and piercing operations is a major problem in manufacturing of aluminum sheet metal parts. Metal slivers are produced due to burnishing and fracturing of the aluminum at the edge of the trimmed or pierced sheet. These slivers are transferred to the sheet or tools during subsequent operations and produce scratches or other defects in formed panels. Hand finishing of formed parts is often required to eliminate the defects produced by the slivers and give an acceptable class A finish. Metal slivers are a larger problem with aluminum stampings than with steel for two reasons: (1) aluminum fractures differently than steel, leading to a larger number of slivers at the sheared edge, and (2) aluminum is softer than steel and more susceptible to damage from the slivers during handling between forming operations.

Accordingly, it is desirable to have a practice for performing die shearing operations on a sheet of age-hardened aluminum alloys without producing slivers.

SUMMARY OF THE INVENTION

This invention provides a method for reducing sliver formation in age-hardenable aluminum sheet alloys ($\leq 3$ mm) especially during trimming and piercing operations. A short, high-temperature heat treatment is applied to either the entire age-hardened blank or selected areas prior to lubrication and forming. The heat treatment, called retrogression, involves rapid heating to between 250° C. and 500° C. preferably for less than 10 seconds, producing temporarily a very soft condition. After heat treatment, a sheet is typically subjected to a series of die operations including forming (e.g., stamping), trimming and piercing. As long as the sheet remains in the softened condition produced by this heat treatment, a clean edge is produced by trimming or piercing without burrs or the formation of metal debris called slivers. The formed part then age-hardens again to its former condition.

Other objects and advantages of the invention will become more apparent from a detailed description thereof which follows.

DESCRIPTION OF THE PREFERRED EMBODIMENT

Metal sliver formation during trimming and piercing operations is a significant problem in the production of aluminum sheet metal stampings. The practice of the subject invention will be better understood in the context of an example of a trim die operation.

Figure 1A:
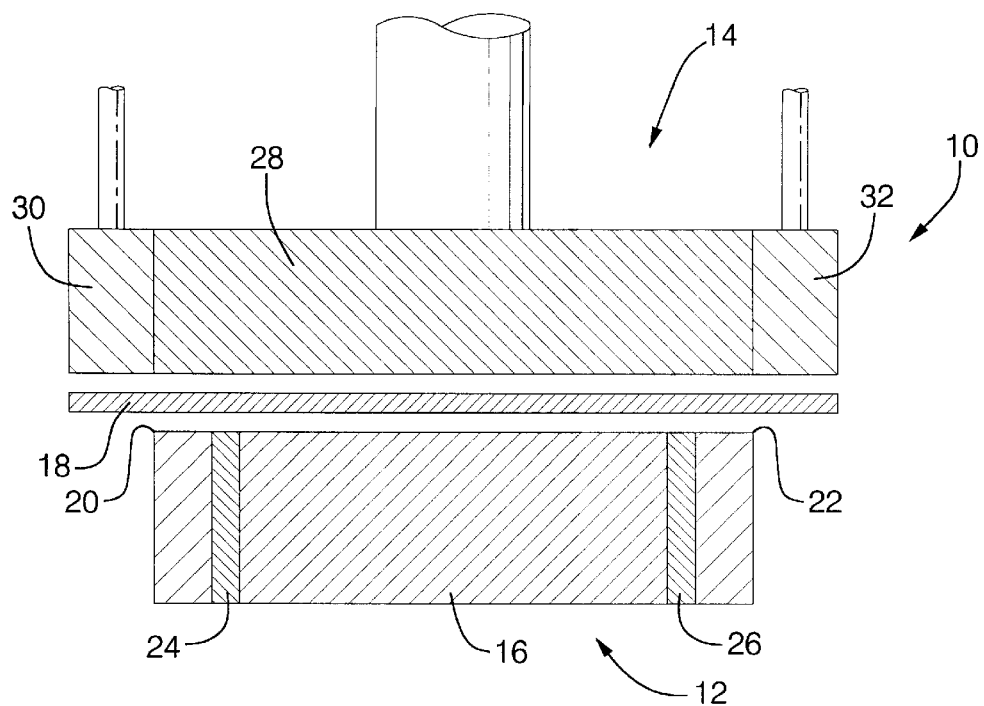
FIG. 1A illustrates a trim die combination in the open position with an aluminum sheet blank in position to be trimmed.

FIG. 1A is a schematic view of a trim die 10 used in shearing experiments with age-hardened aluminum alloys that included practices in accordance with the subject invention. The trim die 10 was used in a 200 ton hydraulic press, not shown.

Trim die 10 is a combination of steel die members including a fixed lower die member 12 and a movable upper die member 14. The fixed lower die provides a suitable support surface 16 for aluminum alloy sheet blank 18. In the case of this example, the blank 18 and support surface 16 are flat. However, in many trimming applications, the aluminum sheet will have formed portions that will have to be accommodated by the trim die set.

Lower die 12 also has shear edges 20 and 22 that underlie the portions of blank 18 that are to be cut away. Inserts 24 and 26 in the lower die member are used for controlling the lateral position of shear edges 20 and 22.

Upper die member 14 includes three members that are independently movable along a vertical axis. In FIG. 1A, the upper die 14 is shown in its upper, die open position for blank insertion. The upper die 14 includes a central, ram-driven, blank clamping portion 28 with separately movable, ram-driven shear or trim members 30 and 32 at each edge. Each of the upper die members are independently hydraulically actuated by means not shown.

Figure 1B:
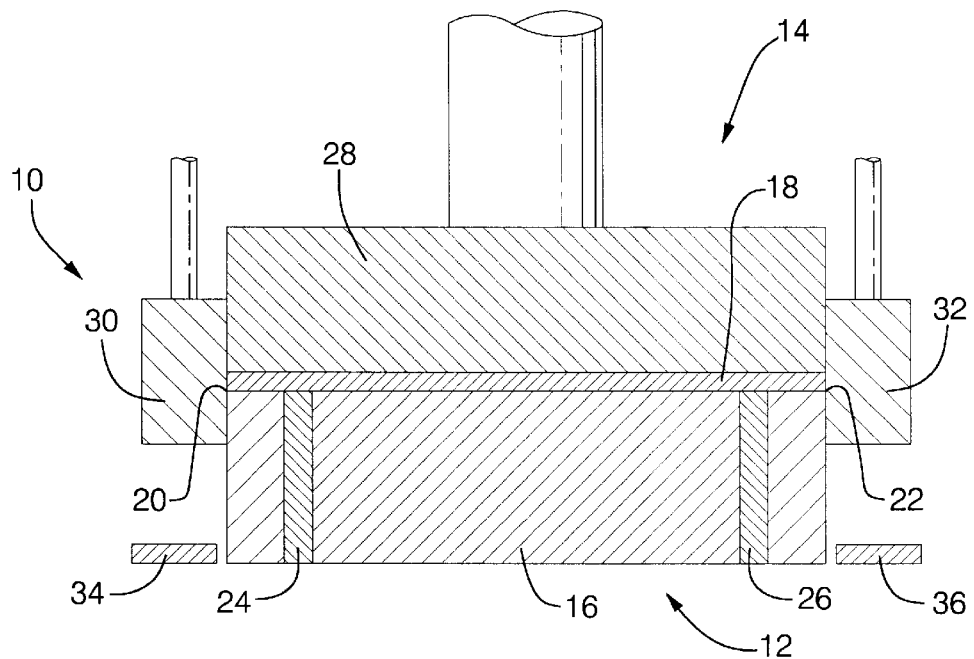
FIG. 1B illustrates the trimming operation of the die combination of FIG. 1B.

FIG. 1B shows the trim operation of trim die 10. Clamping portion 28 has descended to clamp blank 18 against support surface 16. Trim members 30 and 32 have descended simultaneously to first engage blank 18 and then to shear off portions 34 and 36 against shear edges 20 and 22. At the bottom of their shearing stroke, trim members 30 and 32 reach a position below edges 20 and 22. A small predetermined space (not shown) between the outer surfaces of shear edges 20 and 22 and the inner surfaces of trim members 30 and 32 accommodates the shearing of blank 18.

Aluminum association alloy 6111 in the T4 temper condition is an alloy that is used in sheet form (for example, about one millimeter in thickness) for making automotive body panels. The nominal composition of alloy 6111 is by weight 0.9% silicon, 0.7% copper, 0.75% magnesium, 0.30% manganese, 0.10% chromium, 0.15% zinc and the balance substantially all aluminum. The invention is deemed applicable to age-hardenable members of several series of alloys including the AA2XXX, 6XXX and 7XXX series. However, the invention will be illustrated with respect to this commercially-used material in the automotive panel forming practice.

Current commercial practice for the die trimming of age-hardened aluminum alloys such as 6111 is to provide for a trim clearance of about 6% to 10% of the metal thickness. In terms of the above-described trim die, this means that the clearance between a shear edge 20 and a shear member 30 should be provided that is in such specified range. Five test blanks of age-hardened 6111-T4 alloy were sheared in the above-described trim die with a clearance on one side of 0.0762 millimeters and a clearance on the other side of 0.1143 millimeters. The nominal thickness of the strips was one millimeter. All blanks were lightly oiled on both sides with Parco Pre-lube MP404 supplied by Alcoa. After trimming, the trimmed edge and the scrap pieces were carefully protected in separate envelopes. Any slivers formed during trimming were collected. Sliver formation on the 6111-T4 (age-hardened) material was severe on the side with a clearance of 0.0762 millimeter and modest, but undesirable, on the side with the 0.1143 millimeter clearance. The slivers formed on the 0.0762 mm clearance side ranged from 1 mm to 5 cm in length. Loose slivers were present on the trimmed panel and on the scrap material. In addition, long slivers about 5 cm in length were attached to the trim edge. On the 0.1143 mm clearance side, only small slivers were present.

Figure 3:
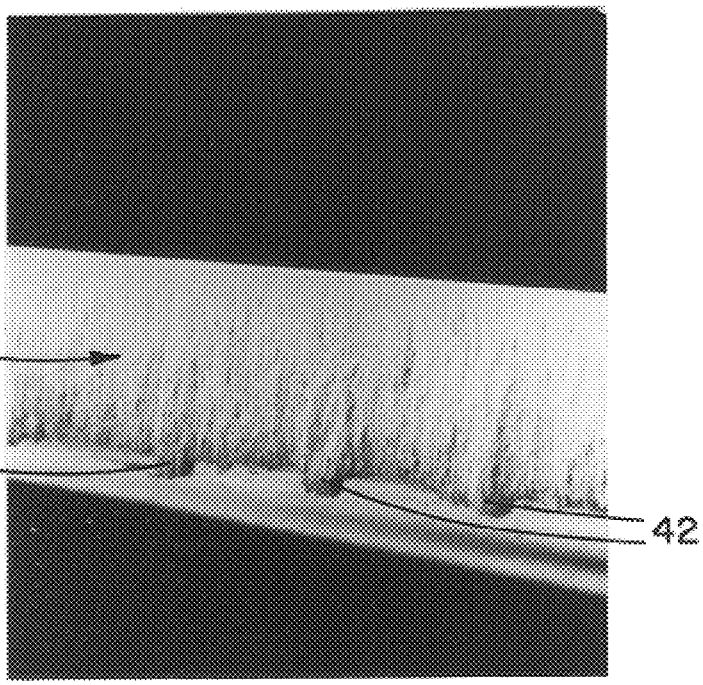
FIG. 3 is a photograph at approximately 25× magnification of a trimmed edge of age-hardened 6111-T4.

FIG. 3 shows the sheared edge 40 of the 6111-T4 blank. There is no clear distinction in the surface between burnishing and clean fracture. Several burrs 42 are seen even in the relatively small region of the photograph.

It is the general experience of trimming technology that more brittle materials will shear more readily and, therefore, require only a small shearing clearance. Softer materials, on the other hand, require a larger shear clearance to produce an acceptable trimmed edge. Neither clearance employed above with the age-hardened 6111-T4 alloy provided an acceptable trimmed edge.

Five additional blanks of the 6111-T4 sheet alloy were subjected to a heat treatment in accordance with the invention. Each strip was heated for five seconds at 300° C. by placing the blank between two heated steel platens. The samples were water-quenched immediately after heating. Thus, each sample of the age-hardened material was subjected to a brief softening heat treatment with quench to provide a softer material for trial in the trim operation. The trimming tests were conducted immediately after the heat treatment and quenching to preserve the soft condition of the treated blanks. The five heat treated blanks were sheared under the same conditions as the above-described age-hardened blanks. The two different clearances were again used: 0.0762 mm and 0.1143 mm.

Figure 2:
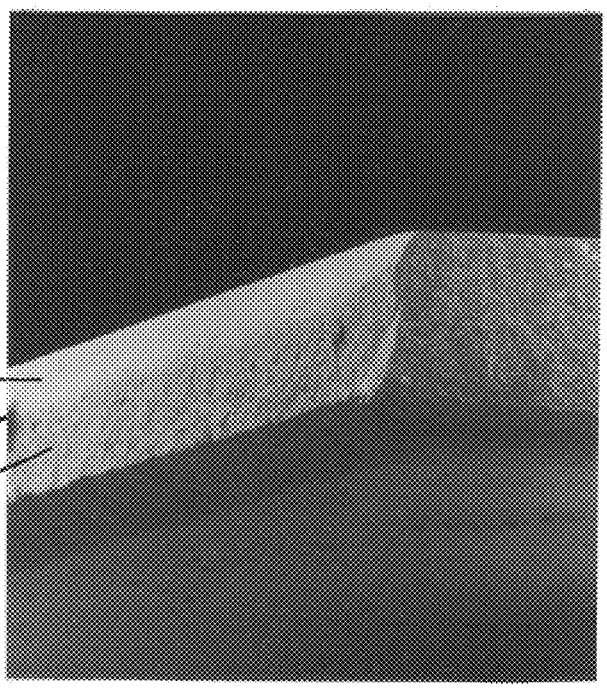
FIG. 2 is a photograph at approximately 25× magnification of a trimmed edge of 6111-T4 sheet that was heat treated in accordance with this invention prior to shearing.

No slivers were formed under either clearance condition during trimming of the heat-treated strips. Shearing of the heat-treated strips produced a very clean trim edge with a burr, and the burr-free condition was not affected by trim clearance. FIG. 2 shows the edge 44 and corner of the trimmed piece. As seen in FIG. 2, the sheared heat-treated blanks showed very distinct burnished 46 and fractured regions 48. The fractured region was larger on the sample with the smaller trim clearance, and there is no evidence of any burr or sliver formation.

Improving trimming by heat treating a material to a softened condition is counter intuitive and contrary to actual practice in the field. In general, a softer material requires a larger clearance to produce an acceptable trimmed edge. In the present work, however, softening by retrogression produced a better trim edge than a harder material under the same clearance conditions. Also, harder materials tend to show less burnishing; however, in the present work, retrogressed material actually exhibited less burnishing than non-retrogressed material.

The aluminum alloy used in the above-described work was 6111. Sliver formation is a major problem in sheet materials which are used for automobile outer panels due to class A finish requirements. Typical outer panel materials are 6XXX series alloys, specifically 6111, 6022, 6005, 6016, and K622. The subject heat treatment is effective in reducing or eliminating sliver formation in all age-hardenable aluminum alloys. The heat treatment will work on material in both the T4 and T6 condition; however, the common condition for stamping is T4.

The specific combinations of time and temperature used in this work (5 s at 300° C. and 7 s at 475° C.) were selected as typical retrogression heat treatments and were developed specifically for AA 6111-T4. Many combinations of time and temperature can be used to prevent sliver formation in 6111.

The specific heat treatment time and temperature will, of course, need to be developed for each alloy that is to be trimmed or pierced. However, in general, the above-identified precipitation-hardenable aluminum alloys are susceptible to substantial improvement in their shearing operations by heat treatment of at least the region of the sheet to be sheared at a temperature in the range of about 250° C. to 500° C. for a period of less than ten seconds followed by a quench operation. Such heating and quenching temporarily softens the treated region of aluminum sheet to facilitate the shearing operation. In the case of the AA6111 alloy, it was found that when the sheet was heated to a temperature of 400° C. or higher, the heat treatment could be successfully carried out for any period of time up to 30 seconds or so, although there is no advantage to expending such energy after heating for a few seconds. When the 6111-T4 or T6 is heated at lower temperatures $\leq 400°$ C., the time at temperature is more critical. For heat treatment temperatures below 400° C., the heating time for maximum softness is t(seconds)=$1.592 \times 10^{-6}$ exp (8549/T) where T is in degrees Kelvin. However, softening benefits are obtained at these lower temperatures at times approximating the optimum times.

Similar heating schedules can be determined for other age-hardened alloys of the 2XXX, 6XXX and 7XXX series. Sliver-free, shearing benefits are obtained by rapid heat treatment at 250° C. to 500° C., preferably 400° C. to 500° C., to dissolve the hardening precipitate and then quenching to room temperature to prevent immediate rehardening.

The heat treatments used to reduce sliver formation could be applied using a variety of methods which enable very rapid, controlled heating:

(a) Oil or salt bath as used in the present work.

(b) Conduction heating by placing blank or part of blank between two heated platens to rapidly heat panel.

(c) Laser heating. This could also be used to heat treat selected areas.

(d) Induction heating. This could also be used to heat treat selected areas.

Laser or induction heating are likely the most attractive methods for use in a production setting.

While the invention has been described in terms of preferred embodiments it is recognized the other forms could readily be adapted by those skilled in the art. Accordingly, the invention is limited only by the following claims.

I claim:

1. In the method of making a sheet metal article of manufacture from age hardened aluminum alloy sheet stock comprising shearing a region of the sheet for the purpose of trimming or piercing the sheet and subsequently pressing the sheet against a forming die to form the sheet into a desired configuration, the improvement for reducing sliver formation during shearing comprising, heating said sheet in said region to a temperature above 250° C. and quenching the heated region to temporarily soften the region, performing the shearing operation on said sheet in die softened region, any remaining nonsheared, softened portion of said region thereafter undergoing age hardening, and pressing the sheared sheet.

2. In the method of making an automotive sheet metal body panel from age hardened aluminum alloy sheet stock comprising shearing a region of the sheet for the purpose of trimming or piercing the sheet and subsequently pressing the sheet against a forming die to form the sheet into a desired panel configuration, the improvement for reducing sliver formation during shearing comprising, heating said sheet in said region to a temperature above 250° C. and quenching the heated region to temporarily soften the region, performing the shearing operation on said sheet in the softened region, any remaining nonsheared, softened portion of said region thereafter undergoing age hardening and pressing the sheared sheet.

3. A method of reducing sliver formation as recited in claim 1 in which said region of the sheet is heated to a temperature in the range of about 250° C. to 500° C.

4. A method of reducing sliver formation as recited in claim 2 in which said region of the sheet is heated to a temperature in the range of about 250° C. to 500° C.

5. A method of reducing sliver formation as recited in claim 1 in which said heating is conducted for a period of up to about ten seconds.

6. A method of reducing sliver formation as recited in claim 2 in which said heating is conducted for a period of up to about ten seconds.

* * * * *